H. R. ALLEN.
Corn-Planter.
No. 18,128.  Patented Sept. 8, 1857.
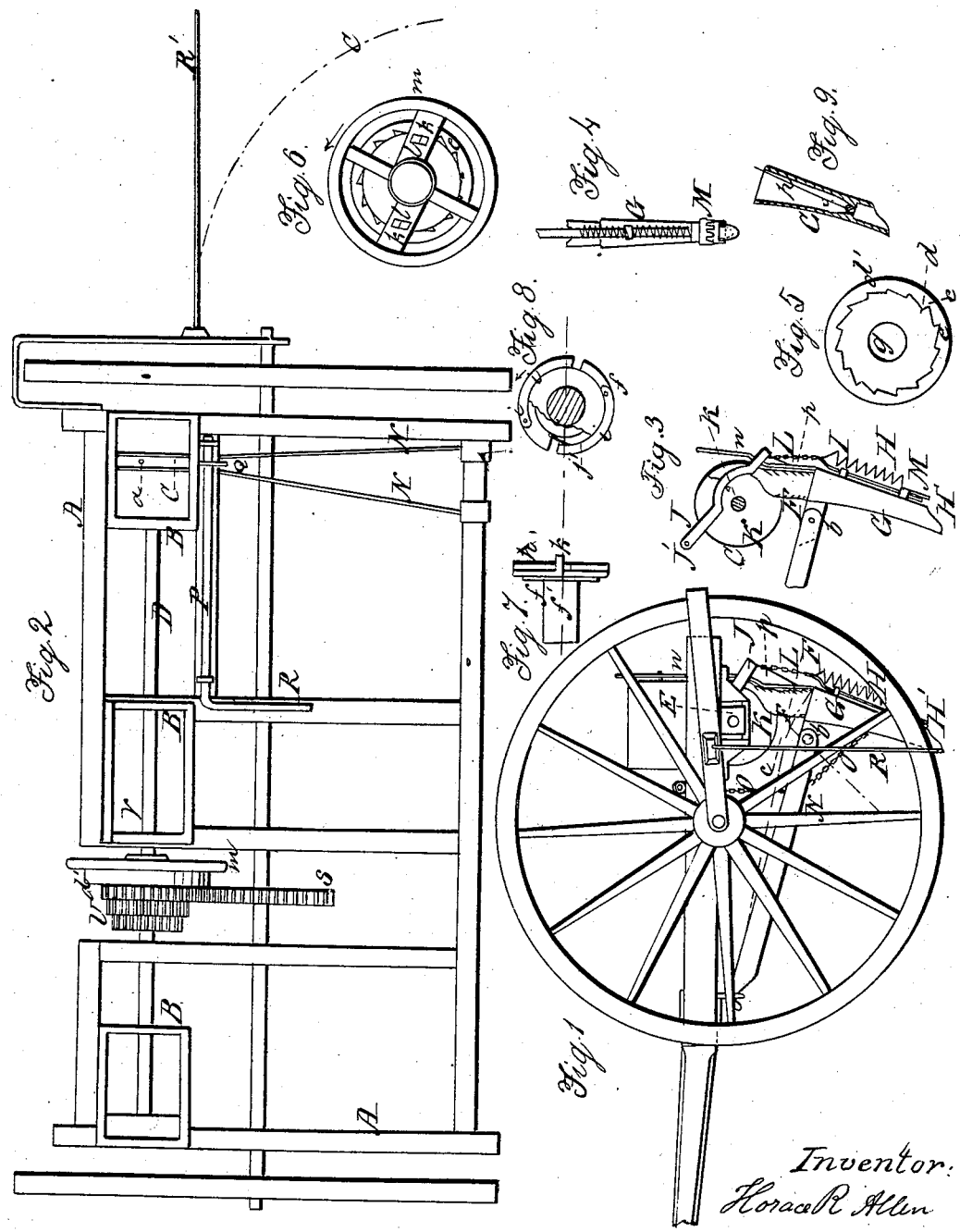
Inventor:
Horace R Allen

UNITED STATES PATENT OFFICE.

HORACE R. ALLEN, OF ATHENS, OHIO.

IMPROVEMENT IN CORN-PLANTERS.

Specification forming part of Letters Patent No. 18,128, dated September 8, 1857.

*To all whom it may concern:*

Be it known that I, H. R. ALLEN, of Athens, in the county of Athens and State of Ohio, have invented a new and useful Improvement in Corn-Planters; and I do hereby declare that the following is a full and exact description thereof, reference being had to the accompanying drawings, in which—

Figure 1 is a side view of my improved corn-planter, and Fig. 2 a plan view. The other figures are detached sections, which will be referred to in description.

Like letters denote like parts in the different views.

The machine is mounted upon two wheels, with a suitable axel or shaft, and drawn by one one or two horses, according to the size of the machine, as the machine may be constructed with one or more seed-boxes.

A A represents the frame of the machine, to which the seed-boxes B are attached, and also the apparatus for dropping and conveying the corn to the ground. At the bottom of the seed-box is placed a roller, C, which is connected to the shaft D, Fig. 2, which has its bearings in boxes at each end of the machine corresponding to E, Fig. 1. In the roller C are cups $a$ to receive the grain, from which cups the grain passes into the flexible spout G to the ground, where it is covered up by the scraper H, attached to the back of the spout G (seen in Figs. 3 and 4) by guides, so as to allow the scraper to slide up and down by the action of the spring I and lever J, in connection with the pins K K, the lever J being attached to the scraper by the chain L, or its equivalent, and the spring I being so connected and arranged as to draw the scraper down when raised. The lever J is attached to the frame by a pin-joint at J'.

As the machine passes along the ground, in the operation of planting, the scraper is drawn down to H' by the force of the spring, and covers up the drill formed by the spout G which precedes it, and there is at all times a certain amount of earth in front of the scraper, upon the same principle as drawing or scraping the earth toward one with a hoe. As soon as the corn is dropped one of the pins K K raises the lever J to the position seen in Figs. 3 and 4, and as the scraper passes over the earth which it has raised in front it carries the upper portion along with it and thereby covers up the grain, and the rake M also rakes the earth over the corn after it is covered by the scraper. As soon as the lever J is relieved from the pin the lever and scraper are again drawn down by the action of the spring to H'. Thus the raising of the lever and scraper, before described, is in accordance with the dropping of the corn, there being two cups in the roller C corresponding with the pins K K. Thus the corn is covered up as soon as dropped, which answers substantially the same purpose as if a hole were dug, the corn dropped in and covered up, as the spout forms a depression into which the corn drops and is covered up by the scraper and rake, which follow directly after the spout. To the spout is connected the rack-rod $n$, which is provided with holes and pin, so as to raise or lower the spout as may be required. The spout is hung to the frame by the arms N, with a joint at $b$. To the spout is attached a chain, O, Fig. 1, which is also connected to the shaft P, Fig. 2, by means of the lever Q. The spout and arm, being connected by a joint, are raised, as indicated by the red lines, Fig. 1, by the action of the lever R on the shaft. By this means the spout may be raised or lowered and enter the ground more or less, as may be required.

Attached to the side of the machine in any proper manner is the rod R', Figs. 1 and 2, which is curved, as indicated by the line $c$. The end of the rod R' is in a line with the spout G, as shown in Fig. 1, and the width between the spout and end of the rod is the same as the distance between the spouts. By this rod it can be ascertained whether the machine is planting in line or not with the previous rows, as the rod will reach each hill successively at the time the corn is dropped if the machine is planting in line with the previous rows, and by means of the rod it is determined whether the machine overreaches or falls short of the line of the previous rows. The driver, being seated on the top of the middle seed-box, can determine this by watching the rod at the time it reaches the planted hill.

For the purpose of adjusting the machine so that it will continually drop the seed at proper intervals in line with the previous rows, in case it should overreach or fall short, I have attached to the machine certain devices for this purpose.

On the driving-shaft is placed the spur-wheel

S, Fig. 2, which meshes into any one of the gearing U. By means of these gears the seed may be dropped fast or slow, the rows or hills being a greater or less distance apart.

The shaft V and its boxes are made adjustable, so that the various seed-gears U will mesh into the gear S. Attached to the gearing is the wheel, which has ratchet-teeth $e$ on the inside, as seen in Figs. 5 and 6. The flange of the thimble $f$, Figs. 7 and 8, fits into the chamber $d$ of the wheel $d'$, as seen in Fig. 6. The shank $f'$ slips into the hole $g$, so as to allow the thimble to turn, and with it the shaft, independent of the gearing U and wheel $d'$. The gearing U is attached to the shank $f'$, which projects through the wheel. To the flange $h$ of the thimble are attached, by a joint at $i\ i$, two pawls, $r'\ r'$, or catches, with a spring on the inside, as seen in Fig. 8. The action of this spring is to throw out the catches, one end of which is turned at right angles, forming fingers, as seen at $k$, Fig. 7, which enter the slots $l$, Fig. 6, in the arms of the wheel $m$. This wheel is secured to the shaft V, and the shaft passes through the thimble upon which the gears U are hung. By this arrangement the shaft V, wheel $m$, and thimble $f$ move, independently of the gearing U, in either direction. By turning the hand-wheel $m$ in the direction of the arrow, Fig. 6, the catches will be made to approximate and move out of the ratchets $e$ by the action of the slots on the fingers $k$, these slots being so curved that they draw the catches together out of the ratchets, so that the shaft V and seed-rollers C may be turned the required distance. By turning the hand-wheel in a reverse direction of the arrow the catches will slip out of the ratchets themselves by the angle or inclination of the ratchets. By the action of the spring $j$ the catches are forced into the ratchet-teeth.

In case the corn falls short of being in line with the previous rows, by turning the wheel in the direction of the arrow the seed-roller may be caused to drop the seed at the proper time, and in case the dropped corn should overreach the line of the previous rows, by turning the wheel in a reverse direction of the arrow the grain will be dropped as required. The rod R' will at all times indicate whether the seed is being dropped in the proper line, as before stated.

The driver may be so seated as to have the wheel $m$ within reach and readily operated.

In the spout G is placed a ball-valve, $v$, or its equivalent. By this means the corn, after it passes from the seed-box, is retained in the spout by the valve until the spout arrives at the proper place to drop it, when the valves are raised by the lever J, it being connected to the valves by the rod or cord $p$, so that the valve is opened at the time the scraper is operated. In case the seed should pass out of the box before the spout arrives at the proper place, it is retained in the spout, so as to drop it at the exact time to be in line with the previous hills. The raising of the lever J by the pins K K, so as to control the dropping, is operated by the wheel $m$ and the thimble, and catches with the ratchets, as before described.

By the arrangement and combination of the gearing U, wheel $d'$, with the ratchets $e$, thimble $f$, and catches, these will all revolve simultaneously with the shaft V and seed-rollers. By detaching the catches from the ratchet-teeth $e$ the machine will then traverse and the gearing revolve, while the shaft V and seed-rollers remain stationary or are turned forward or backward, in the manner and for the purpose hereinbefore described, by which corn may be planted in rows both ways.

F is a flexible spout, which conveys the corn or other seed from the cups $a$ to the spout G.

What I claim as new and my improvement is—

The lever J, pins K, scraper H, spring I, and rake M, when arranged in the manner described, and in combination with the spout G and valve $v$, for the purpose set forth.

HORACE R. ALLEN.

Witnesses:
  G. H. BONHAM,
  I. BRAINERD.